(12) United States Patent
Haji-Valizadeh

(10) Patent No.: US 12,437,393 B2
(45) Date of Patent: Oct. 7, 2025

(54) APPARATUS, METHOD, AND NON-TRANSITORY COMPUTER-READABLE STORAGE MEDIUM FOR COMBINING REAL-NUMBER-BASED AND COMPLEX-NUMBER-BASED IMAGES

(71) Applicant: CANON MEDICAL SYSTEMS CORPORATION, Tochigi (JP)

(72) Inventor: Hassan Haji-Valizadeh, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 528 days.

(21) Appl. No.: 17/853,456

(22) Filed: Jun. 29, 2022

(65) Prior Publication Data

US 2024/0005481 A1 Jan. 4, 2024

(51) Int. Cl.
*G06T 7/00* (2017.01)
*G06N 3/08* (2023.01)
(Continued)

(52) U.S. Cl.
CPC .......... *G06T 7/0012* (2013.01); *G06N 3/08* (2013.01); *G06T 5/50* (2013.01); *G06T 5/70* (2024.01);
(Continued)

(58) Field of Classification Search
CPC ............... G01R 33/5608; G06T 5/60; G06T 2207/20084; G06N 3/045
See application file for complete search history.

(56) References Cited

U.S. PATENT DOCUMENTS 10,782,378 B2    9/2020   Bolster, Jr. et al.
12,153,111 B2 * 11/2024   Vasanawala ....... G01R 33/4828
(Continued)

FOREIGN PATENT DOCUMENTS

CN    111123183 B * 4/2022 ............. G01R 33/48
CN    114846348 A * 8/2022 ......... G01R 33/4835
(Continued)

OTHER PUBLICATIONS

Cole, Elizabeth K., et al. "Analysis of deep complex-valued convolutional neural networks for MRI reconstruction." arXiv preprint arXiv:2004.01738 (2020). (Year: 2020).*
(Continued)

*Primary Examiner* — Michael Robert Cammarata
(74) *Attorney, Agent, or Firm* — Oblon, McClelland, Maier & Neustadt, L.L.P.

(57) ABSTRACT

The present disclosure relates to a real-number-based neural network operating in combination with a complex-number-based neural network to perform image processing (e.g., using phase-based medical images). In one embodiment, a method includes, but is not limited to, applying, to inputs of a first trained neural network trained to process real-number-based images, first image data generated from real-number-based measurements obtained by imaging a subject; applying, to inputs of a second trained neural network trained to process complex-number-based images, second image data generated from complex-number-based measurements obtained by imaging the subject; and combining a first output of the first trained neural network and a second output (Continued)

of the second trained neural network to produce a combined image, based on the first image data and the second image data.

15 Claims, 14 Drawing Sheets

(51) Int. Cl.
  *G06T 5/50* (2006.01)
  *G06T 5/70* (2024.01)
(52) U.S. Cl.
  CPC ............ *G06T 2207/10088* (2013.01); *G06T 2207/20081* (2013.01)

(56) References Cited

U.S. PATENT DOCUMENTS

| | | | |
|---|---|---|---|
| 2018/0260702 A1* | 9/2018 | Yamamoto | G06N 3/084 |
| 2019/0333227 A1* | 10/2019 | Zhang | G06F 18/217 |
| 2020/0034998 A1 | 1/2020 | Schlemper et al. | |
| 2020/0281570 A1* | 9/2020 | Sato | G01S 7/52028 |
| 2021/0149005 A1* | 5/2021 | Wang | G01R 33/5608 |
| 2022/0036512 A1 | 2/2022 | Kim et al. | |
| 2022/0061818 A1* | 3/2022 | Takeshima | G06N 3/045 |
| 2022/0065970 A1* | 3/2022 | Nickel | G06T 7/0016 |
| 2022/0276094 A1* | 9/2022 | Soto | G01R 23/16 |
| 2022/0375209 A1* | 11/2022 | Kutsuna | A61B 8/5223 |
| 2023/0122915 A1* | 4/2023 | Nehrke | G06N 3/08 702/85 |
| 2023/0236272 A1* | 7/2023 | Vasanawala | G06T 7/0012 324/309 |
| 2025/0005942 A1* | 1/2025 | Panetta | G06V 10/764 |

FOREIGN PATENT DOCUMENTS

| | | | | |
|---|---|---|---|---|
| JP | 2020103365 A | * | 7/2020 | ............ A61B 5/055 |
| KR | 102352242 B1 | * | 1/2022 | |
| WO | WO-2023219963 A1 | * | 11/2023 | ......... G01R 33/5608 |

OTHER PUBLICATIONS

Vasudeva, Bhavya, et al. "Co-VeGAN: Complex-valued generative adversarial network for compressive sensing MR image reconstruction." arXiv preprint arXiv:2002.10523 (2020). (Year: 2020).*

Dedmari, Muneer Ahmad, et al. "Complex fully convolutional neural networks for MR image reconstruction." International Workshop on Machine Learning for Medical Image Reconstruction. Cham: Springer International Publishing, 2018. (Year: 2018).*

Lee, D., et al., "Deep Residual Learning for Accelerated MRI using Magnitude and Phase Networks", Department of Bio and Brain Engineering, Korea Advanced Institute of Science and Technology (KAIST), Bioimaging Research Team, Korea Basic Science Institute; Apr. 2, 2018, pp. 1-11.

* cited by examiner

APPARATUS, METHOD, AND NON-TRANSITORY COMPUTER-READABLE STORAGE MEDIUM FOR COMBINING REAL-NUMBER-BASED AND COMPLEX-NUMBER-BASED IMAGES

BACKGROUND

Field of the Disclosure

The present disclosure relates to improving image quality in medical complex-number-based imaging, and in some embodiments to improving image quality in magnetic phase-based resonance imaging and in ultrasound imaging.

Description of the Related Art

Medical imaging often requires a balancing between increased image quality and reduced acquisition time and/or radiation dosages. Shim scans using magnetic resonance imaging (MRI) systems acquire phase data using a dual-echo sequence. These scans are typically low-resolution with large voxels to save scan time. Higher resolutions can improve the accuracy and stability of shim behavior by reducing partial volume error, and some techniques use super-resolution methods. Such super-resolution methods, however, are not applicable in every image situation. Super-resolution as applied to phase information is ill-defined. One limiting factor is the need to maintain the accuracy of phase information generated from phase-difference images. Phase-difference images are complex-valued datasets with both magnitude and phase information and typically are not directly processed with standard real-valued convolutional kernels.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus, method, and non-transitory computer-readable storage medium for image processing using a combination of neural networks and/or neural network layers that process images (e.g., medical images) in the real-number and complex number domains.

According to an embodiment, the present disclosure further relates to an apparatus for performing image processing, including, but not limited to: processing circuitry configured to apply, to inputs of a first trained neural network trained to process real-number-based images, first image data generated from real-number-based measurements obtained by imaging a subject; apply, to inputs of a second trained neural network trained to process complex-number-based images, second image data generated from complex-number-based measurements obtained by imaging the subject; and combine a first output of the first trained neural network and a second output of the second trained neural network to produce a combined image, based on the first image data and the second image data.

According to an embodiment, the present disclosure further relates to an image processing method including, but not limited to: applying, to inputs of a first trained neural network trained to process real-number-based images, first image data generated from real-number-based measurements obtained by imaging a subject; applying, to inputs of a second trained neural network trained to process complex-number-based images, second image data generated from complex-number-based measurements obtained by imaging the subject; and combining a first output of the first trained neural network and a second output of the second trained neural network to produce a combined image, based on the first image data and the second image data.

According to an embodiment, the present disclosure further relates to a non-transitory computer-readable storage medium storing computer-readable instructions that, when executed by a computer, cause the computer to perform an image processing method including, but not limited to: applying, to inputs of a first trained neural network trained to process real-number-based images, first image data generated from real-number-based measurements obtained by imaging a subject; applying, to inputs of a second trained neural network, trained to process complex-number-based images, second image data generated from complex-number-based measurements obtained by imaging the subject; and combining a first output of the first trained neural network and a second output of the second trained neural network to produce a combined image, based on the first image data and the second image data.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure describes a method for generating combined images from a combination of real-number-based data/images and complex-number-based data/images. By introducing complex-valued convolutional kernels, complex-valued datasets can be processed and used to augment traditional approaches within a neural network environment.

In the present disclosure, a super-resolution framework is developed to process multiple decompositions of phase information in a set of subnetworks to produce at least one of (1) a simulated higher resolution image from a lower resolution image and (2) a less corrupted image from a more corrupted image (e.g., by removing artefacts and/or noise).

Figure 1:
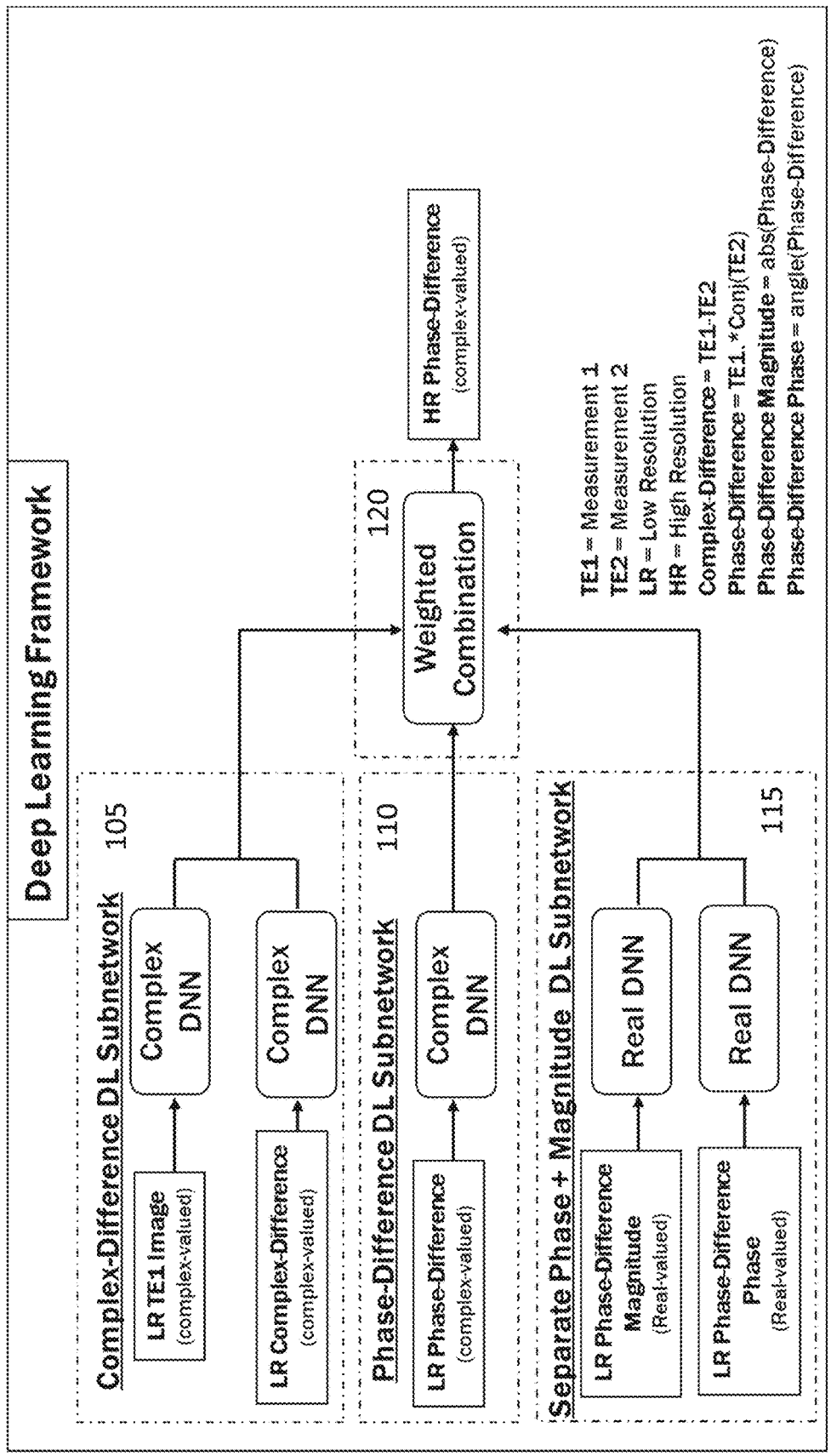
FIG. 1 is an illustrative flow diagram of a method for processing a complex-number-based image according to an exemplary embodiment of the present disclosure.

With reference now to the Drawings, FIG. 1 provides an illustrative flow diagram of a method for processing a complex-number-based image. While method 100 of FIG. 1 will be described with reference to a dual-echo shim scan from an MRI, it can be appreciated that such a technique can be applied to any imaging modality, medical or otherwise, that has phase information.

FIG. 1 provides a high-level implementation of the methods of the present disclosure and is described with respect to a series of Echo Time (TE) measurements that include complex-number-based measurements. However, as should be appreciated, the use of echo time measurements is for illustrative purposes only, and other complex-number-based image sources can be used as well. For example, other types of complex data sets that can be processed using the techniques described herein include, but are not limited to, data from 1. MR based thermometry, 2. 2D and 4D phase contrast MRI, 3. MR based fat-water separation (such as Dixon techniques), 4. Quantitative susceptibility mapping, and 5. Ultrasound. A first subnetwork 105, Complex-Difference Deep Learning (DL) Subnetwork, processes a first type of complex-number-based image data (e.g., lower resolution (LR) echo time 1 (TE1) image data and LR complex-difference) through at least one complex deep neural network (DNN). Complex-difference data can be obtained by subtracting two different complex signals (e.g., by subtracting echo time 2 (TE2) image data from TE1 to produce a difference (TE1-TE2)). As illustrated, the outputs of two complex DNNs are combined to produce an output of the first subnetwork 105.

A second subnetwork 110, Phase-Difference DL Subnetwork, is illustrated as processing LR Phase-Difference through another complex DNN. The phase-difference is determined by multiplying the TE1 by the conjugate of TE2 (TE1×conj(TE2)). The output of the complex DNN is the output of the second subnetwork 110.

A third subnetwork 115, Separate Phase and Magnitude DL Subnetwork, processes the LR Phase-Difference Magnitude through a real DNN and the LR Phase-Difference Phase through a real DNN. The phase-difference magnitude is the absolute value of the phase difference and the phase-difference phase is the angle of phase-difference. These outputs are combined to produce the output of the third subnetwork 115.

The outputs of the first subnetwork 105, the second subnetwork 110, and the third subnetwork 115, are then sent to a fourth subnetwork 120 which is a DL subnetwork trained to optimally weight and combine the outputs from the first three subnetworks to produce a higher resolution (HR) phase-difference image with a resolution greater than the resolution of at least one of the lower resolution images. As would be appreciated by those of skill in the art, each of the networks can initially be trained separately to produce a corresponding neural network to address the noted types of data and then the fourth network 120 can be generated to learn the weightings to be applied to the first through third networks. Alternatively, the four networks can be combined as part of a monolithic system which is trained altogether so that the training process is simplified. In the first case, the individual networks are each trained by using higher resolution data that is downsampled and/or corrupted (e.g., with artefacts and/or noise) to produce lower resolution images and/or corrupted images. Each of the networks is then trained by inputting the lower resolution images and/or corrupted images and attempting to reproduce the original higher resolution image and/or less corrupted image (acting as a target image). Once all of the subnetworks have been trained, the fourth network is trained by applying additional downsampled and/or corrupted images to the trained subnetworks and their outputs are input to the fourth network being trained which also receives corresponding higher resolution images and/or less corrupted images. The process is repeated until the fourth network is trained.

As noted above, a monolithic configuration also is possible, and in that configuration the downsampled and/or corrupted images are input to the various untrained subnetworks and trained to attempt to predict the corresponding higher resolution images and/or less corrupted images.

Figure 2A:
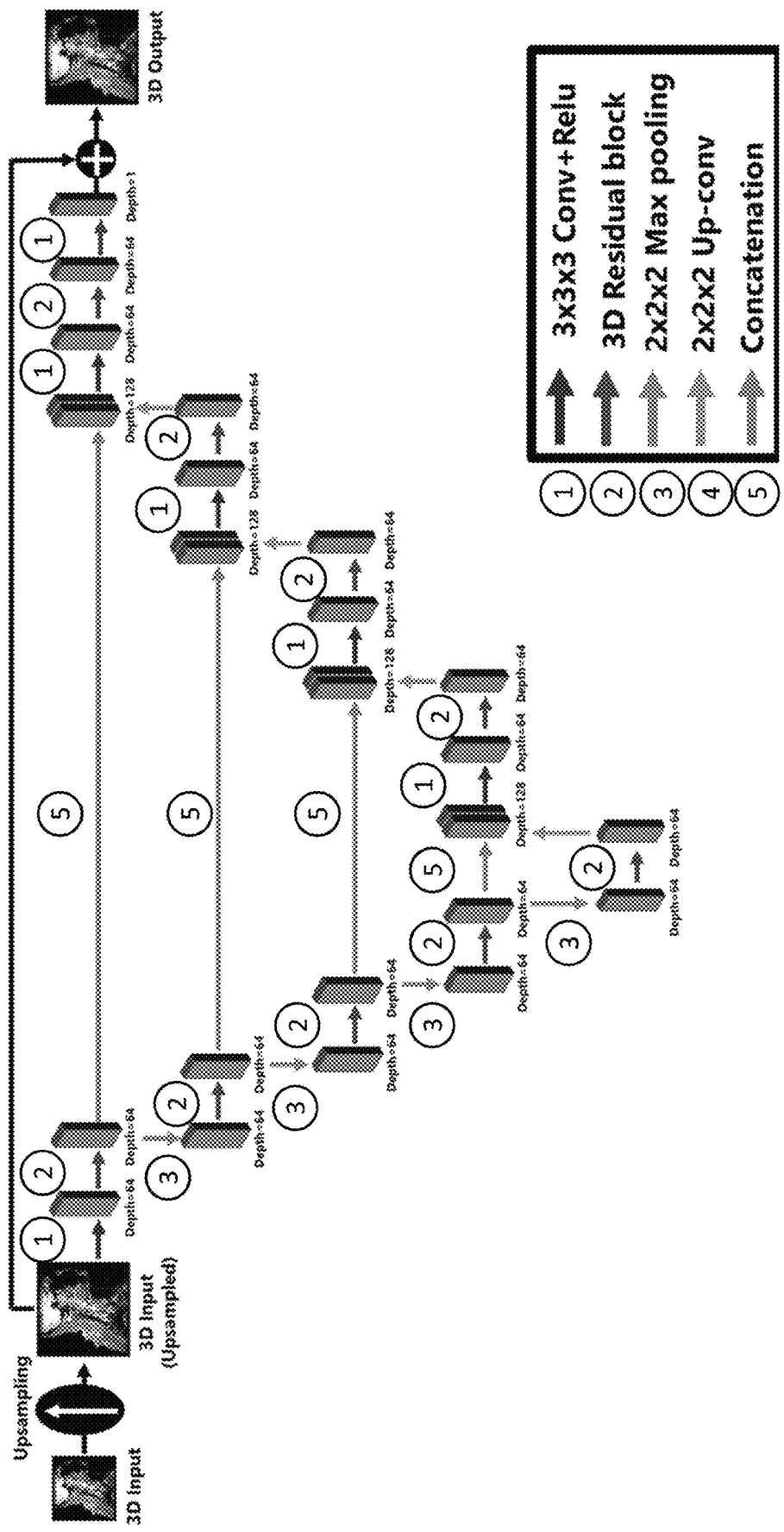
FIG. 2A is a schematic of a real-number-based magnitude deep neural network according to an exemplary embodiment of the present disclosure.

As in FIG. 2A, a real-number-based portion of the method may be based on a Residual U-net architecture. This architecture may be configured to reduce hallucinations generated as compared to systems that use generative adversarial networks (GAN). Incorporating a 3D residual block into the U-net architecture also reduces performance degradation issues often found in U-net architectures.

Figure 2B:
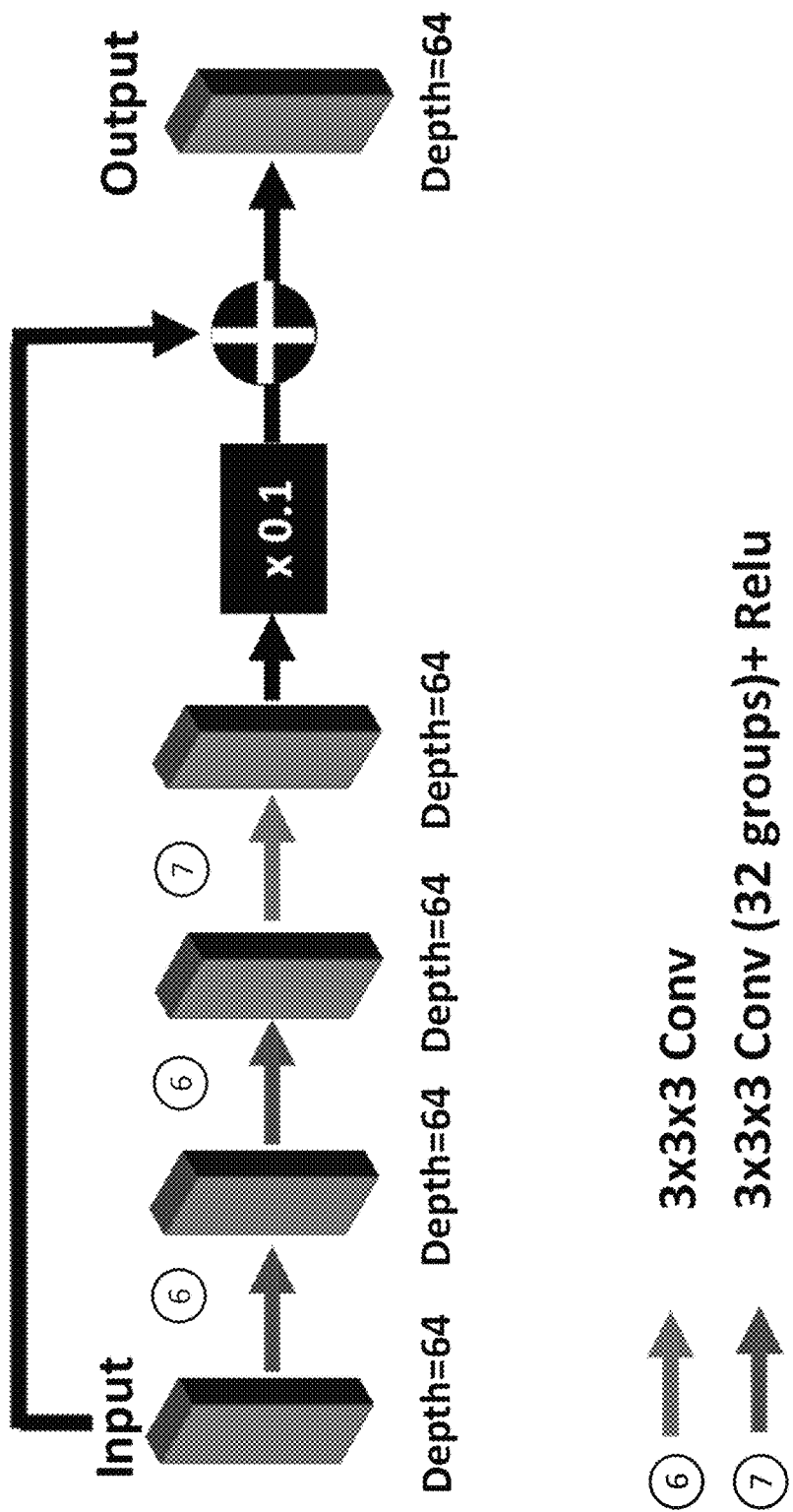
FIG. 2B is a schematic of a 3D Residual Block for use in the complex-number-based deep neural network of FIG. 2A.

As illustrated, a noisy medical image first can be received as an input to a neural network. The degraded medical image is then optionally upsampled. For example, upsampling is preferably used when generating a simulated higher resolution image, but it is less important in configurations performing other tasks, such as artefact reduction and denoising. The U-net architecture may have a downsampling path (left side) and an upsampling path (right side). It should be appreciated that the U-net architecture of FIG. 2A may not be to scale, as it relates to neural network layers, depth, features, and the like, and so should be considered merely representative of a type of super-resolution method that can be employed within the neural network. The downsampling path consists of the application of a 3×3×3 convolution and a rectified linear unit (ReLU) followed by a 3D residual block (shown in additional detail in FIG. 2B) and a 2×2×2 max pooling operation. The 3D residual block consists of the application of a 32 group 3×3×3 convolution and a ReLU twice followed by a 3×3×3 convolution followed by a multiplication of 0.1. This is then added to the input to the 3D residual block to get the 3D residual block output. Subsequent steps of the downsampling path consist of the application of a 3D residual block followed by a 2×2×2 max pooling operation. Each step in the upsampling path includes a 2×2×2 up-convolution that doubles the spatial dimensions of the feature maps, a concatenation with the feature map from the contracting path, and a 3×3×3 convolution and a ReLU (which halves the number of channels) followed by a 3D residual block. At the final layer of the Residual U-net architecture, the path consists of a 2×2×2 up-convolution that doubles the spatial dimensions of the feature maps, a concatenation with the feature map from the contracting path, a 3×3×3 convolution and a ReLU (which halves the number of channels) followed by a 3D residual block, and another 3×3×3 convolution and a ReLU (which brings it back to one channel) which is then added to the original upsampled input to produce the output image, although the illustrated output image (and all "processed" images herein) is a simulated exemplary image for illustrative purposes as opposed to a calculated image.

Figure 2C:
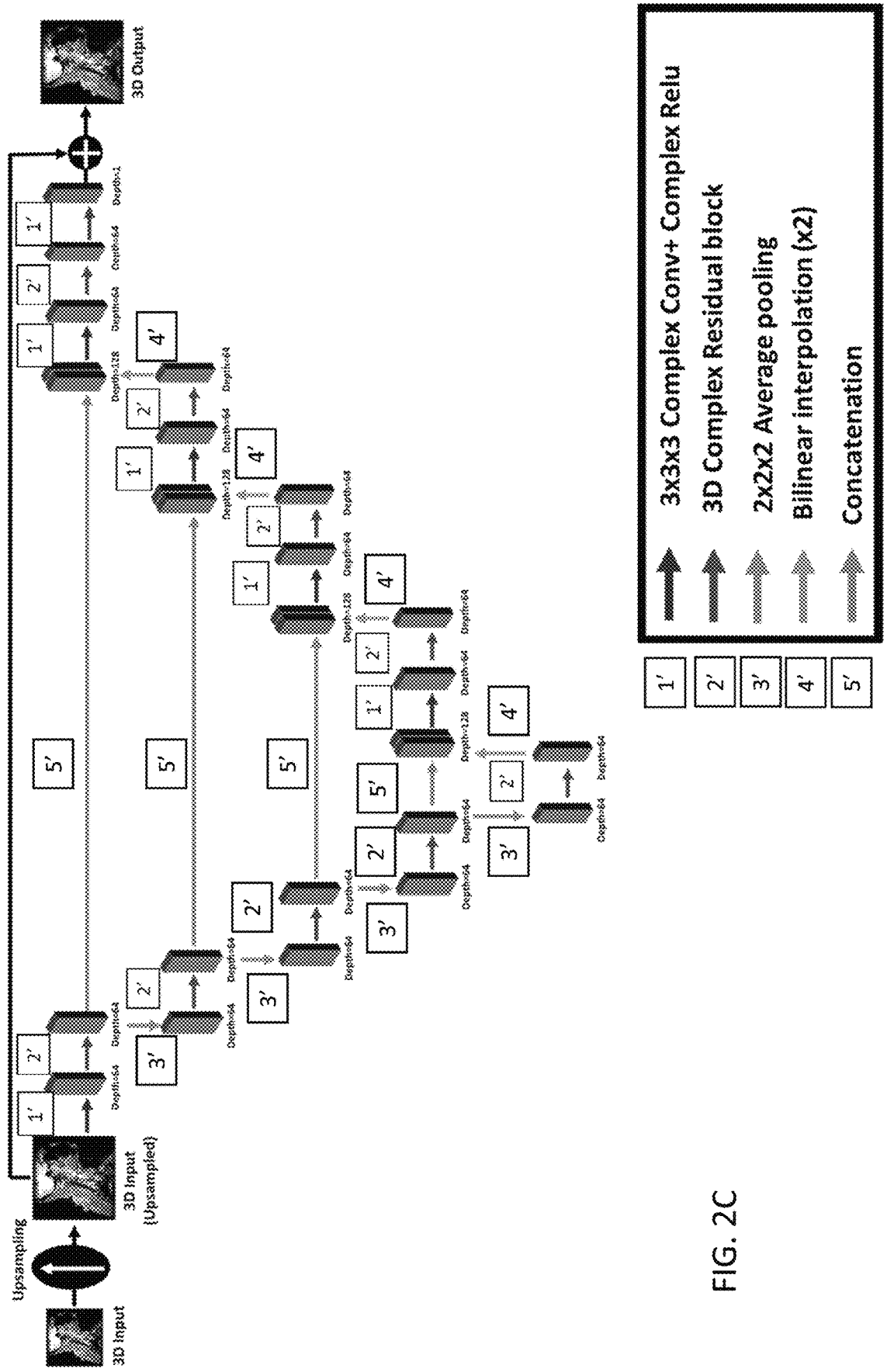
FIG. 2C is a schematic of a complex-number-based deep neural network according to an exemplary embodiment of the present disclosure.
Figure 2D:
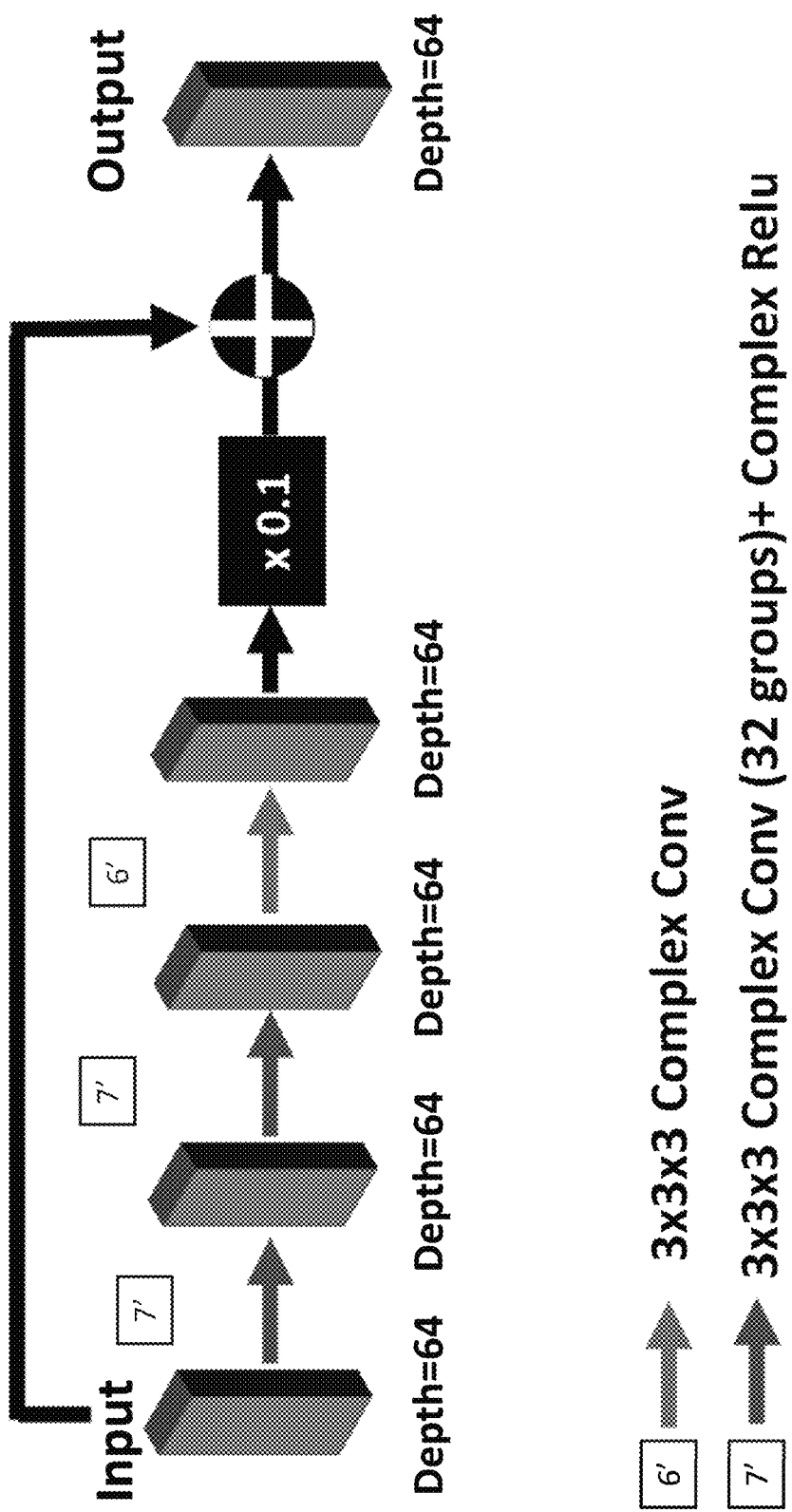
FIG. 2D is a schematic of a 3D Complex Residual Block for use in the complex-number-based deep neural network of FIG. 2C.

Additionally, as shown in FIGS. 2C and 2D, bilinear interpolation, 2×2×2 average pooling, and complex ReLU can be used to enable complex DNN processing of complex-valued data. Bilinear interpolation was used instead of up-convolution to enable a two-fold increase of feature map spatial dimension. Bilinear interpolation can be implemented by applying interpolation to the real and imaginary components of complex feature maps separately. FIG. 2C shows 2×2×2 average pooling being applied instead of 2×2×2 max pooling in FIG. 2A to downsample the feature maps. Average pooling can be implemented by applying average pooling to the real and imaginary components of complex feature maps separately as would have be done if the values has each been real-number-based. Complex ReLU was used instead of real-valued ReLU in complex DNN. Complex ReLU was implemented by applying real-valued ReLU to the real and imaginary components of feature maps separately.

Figure 3A:
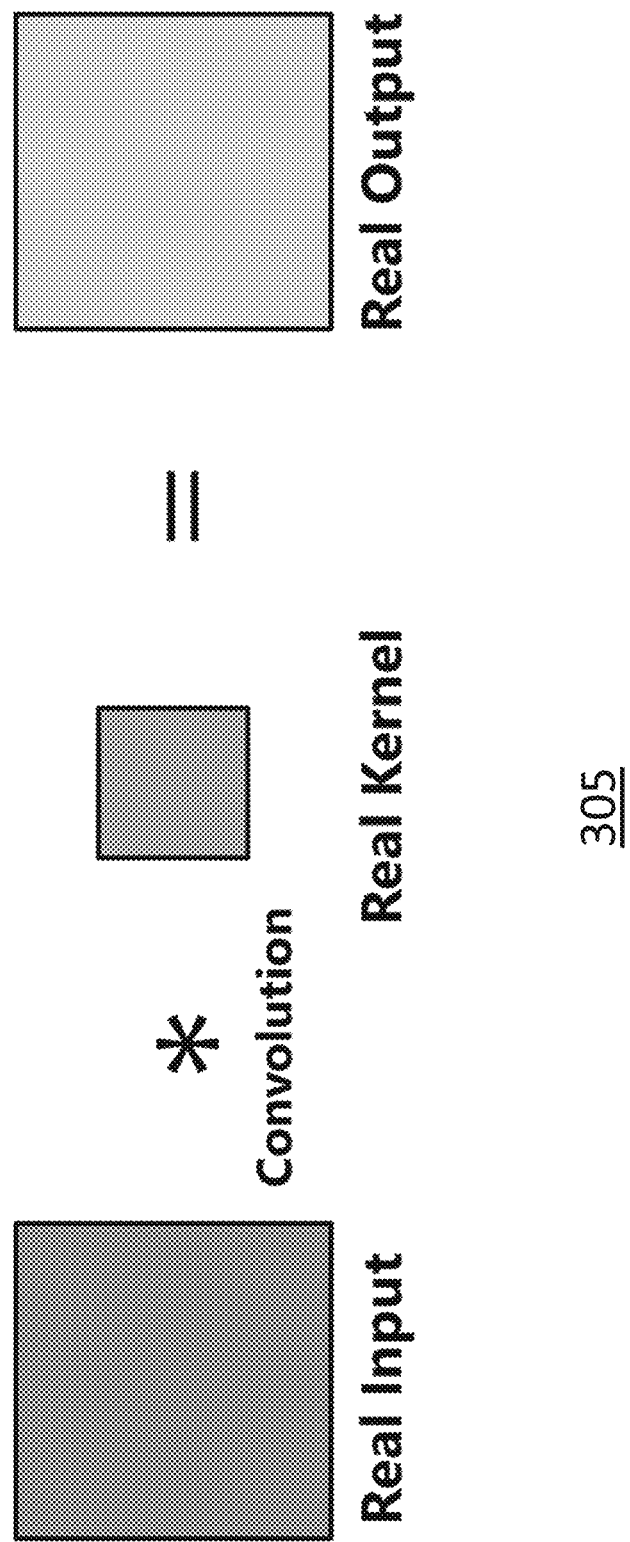
FIG. 3A is an illustrative example of a real-valued convolution method according to an exemplary embodiment of the present disclosure.
Figure 3B:
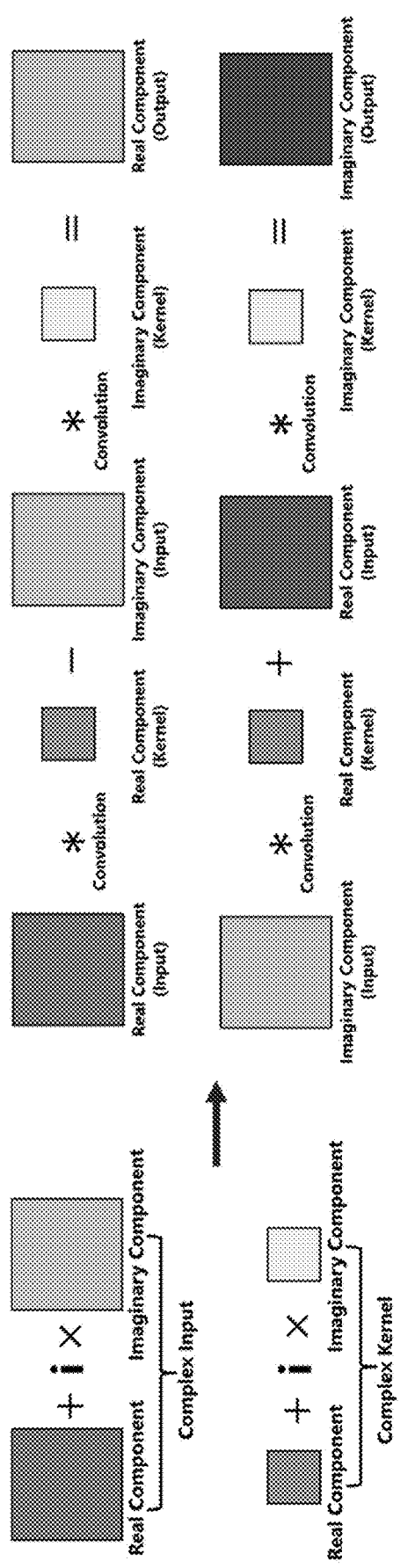
FIG. 3B is an illustrative example of a complex-valued convolution method according to an exemplary embodiment of the present disclosure.

FIG. 3A depicts an example for real-valued convolution, method 305, used in real DNNs, and FIG. 3B depicts an example for complex-valued convolution, method 310, used in complex DNNs. For real-valued convolution, method 305, takes the real input image matrix 315 and multiplies it by the real kernel matrix 320 to obtain the output feature map 325 values.

Method 310 depicts complex-valued convolution which involves real input image matrix 330, imaginary input image matrix 335, real kernel matrix 340, and imaginary kernel matrix 345. The real complex output feature map 350 value is obtained by multiplying the imaginary input image matrix 335 by the imaginary kernel matrix 345 and the result is subtracted from the result of the real input image matrix 330 multiplied by real kernel matrix 340. The imaginary complex output feature map 355 value is obtained by multiplying the real input image matrix 330 by the imaginary kernel matrix 345 and adding it to the result of the imaginary input image matrix 335 multiplied by the real kernel matrix 340.

Figure 4:
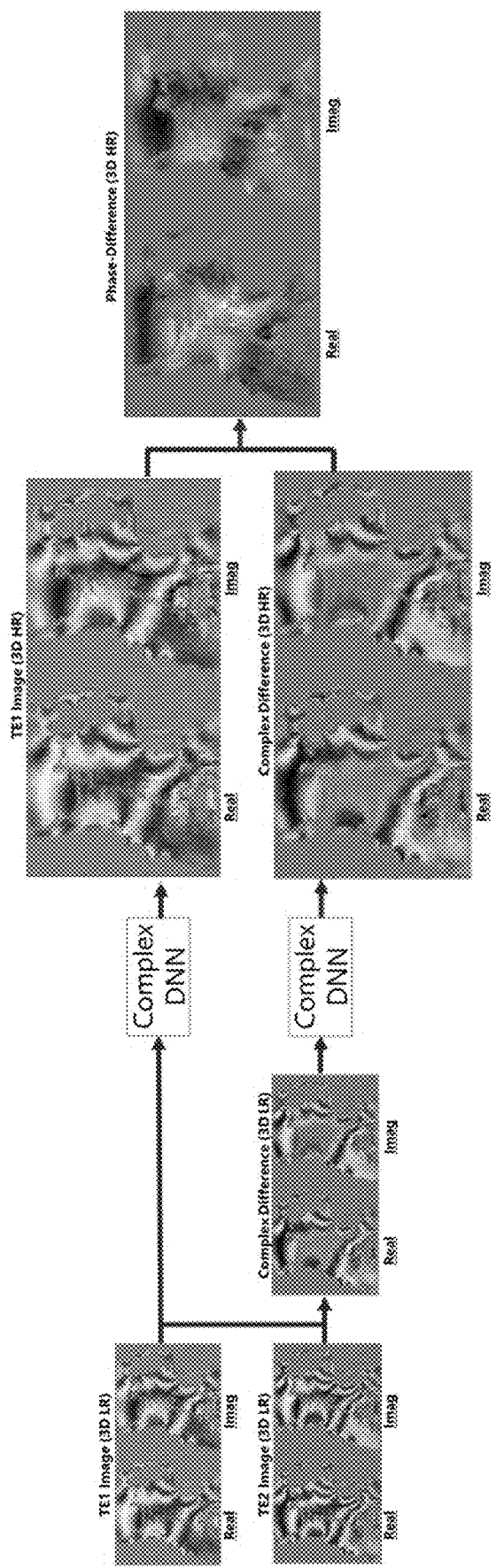
FIG. 4 is a graphic illustration of a complex-difference subnetwork according to an exemplary embodiment of the present disclosure.

FIG. 4 is an illustration of the complex-difference DL subnetwork (105 in FIG. 1) that shows simulated, prophetic images rather than actual images. LR TE1 image and LR TE2 image are input into the subnetwork. The LR TE1 image is processed through a complex DNN to obtain a HR TE1 image. Additionally, the LR TE2 image is subtracted from the LR TE1 image to obtain the LR complex-difference image. The LR complex-difference image is processed through a complex DNN to obtain a complex-difference image which is at least one of (1) a simulated higher resolution and (2) a better quality image (e.g., with less noise and/or artefacts). The HR TE1 image and HR complex-difference image are combined to obtain a first HR phase-difference image. While FIG. 4 depicts moving from LR images to a HR image, the process is the same for other applications like artifact reduction and denoising. Additionally, the complex-difference subnetwork is not required for all image types (e.g., ultrasound).

Figure 5:
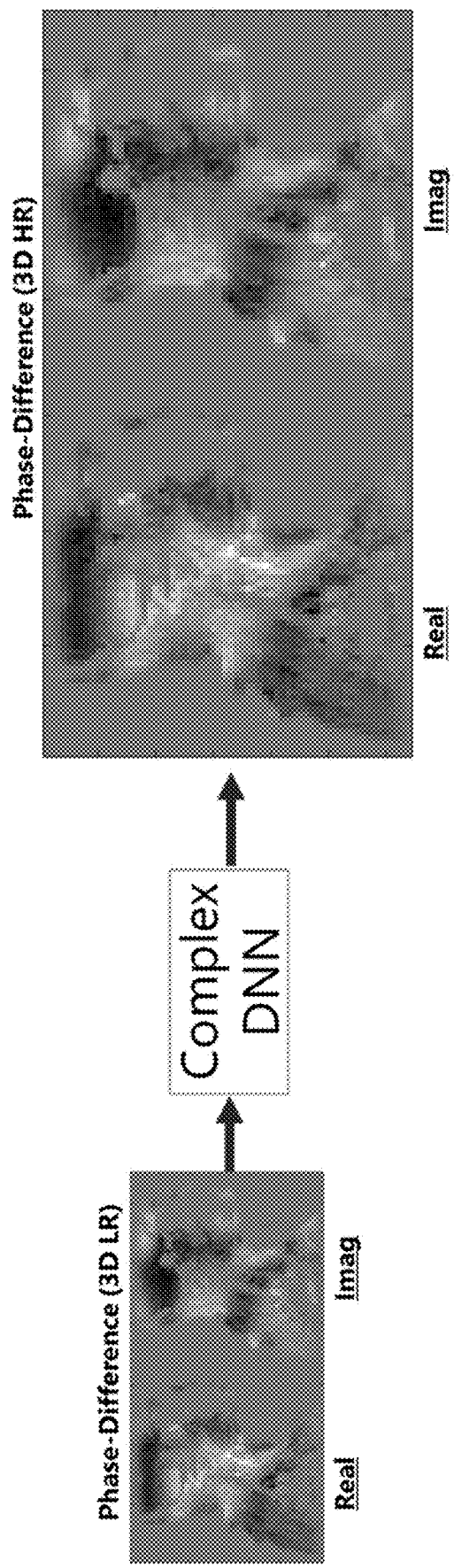
FIG. 5 is a graphic illustration of a phase-difference subnetwork according to an exemplary embodiment of the present disclosure.

FIG. 5 is an illustration of a phase-difference DL subnetwork 110 (FIG. 1) that shows simulated, prophetic images rather than actual images. The input for the phase-difference DL subnetwork is a LR phase-difference image. The LR phase-difference image is obtained by phase-subtracting the LR TE1 and LR TE2 images (TE1×conj(TE2)). The resulting LR phase-difference image is processed through a complex DNN to obtain a second HR phase-difference image.

Figure 6:
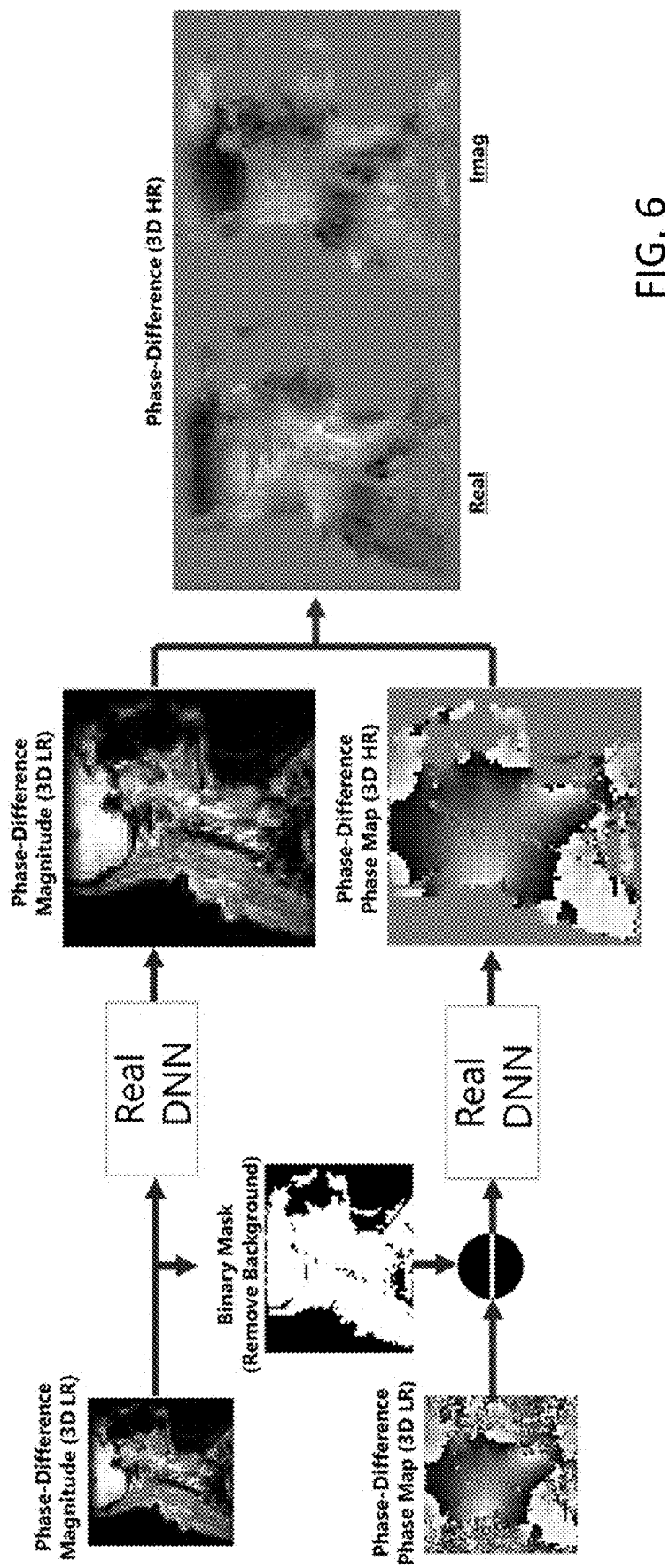
FIG. 6 is a graphic illustration of a separate phase and magnitude subnetwork according to an exemplary embodiment of the present disclosure.

FIG. 6 is an illustration of a separate phase and magnitude DL subnetwork 115 (FIG. 1) that shows simulated, prophetic images rather than actual images. The HR phase-difference magnitude and HR phase-difference phase images are produced by processing LR phase-difference magnitude and LR phase-difference phase images separately using two real DNNs. The LR phase-difference magnitude image is used to generate a binary mask. The binary mask is used to remove LR phase-difference phase image background noise. The LR phase-difference magnitude image is then processed through a real DNN to obtain a HR phase-difference magnitude image. The LR phase-difference phase image with the background noise removed is also processed through a real DNN to obtain a HR phase-difference phase image. The HR phase-difference magnitude image and the HR phase-difference phase image are then combined to produce a third HR phase-difference image.

Figure 7:
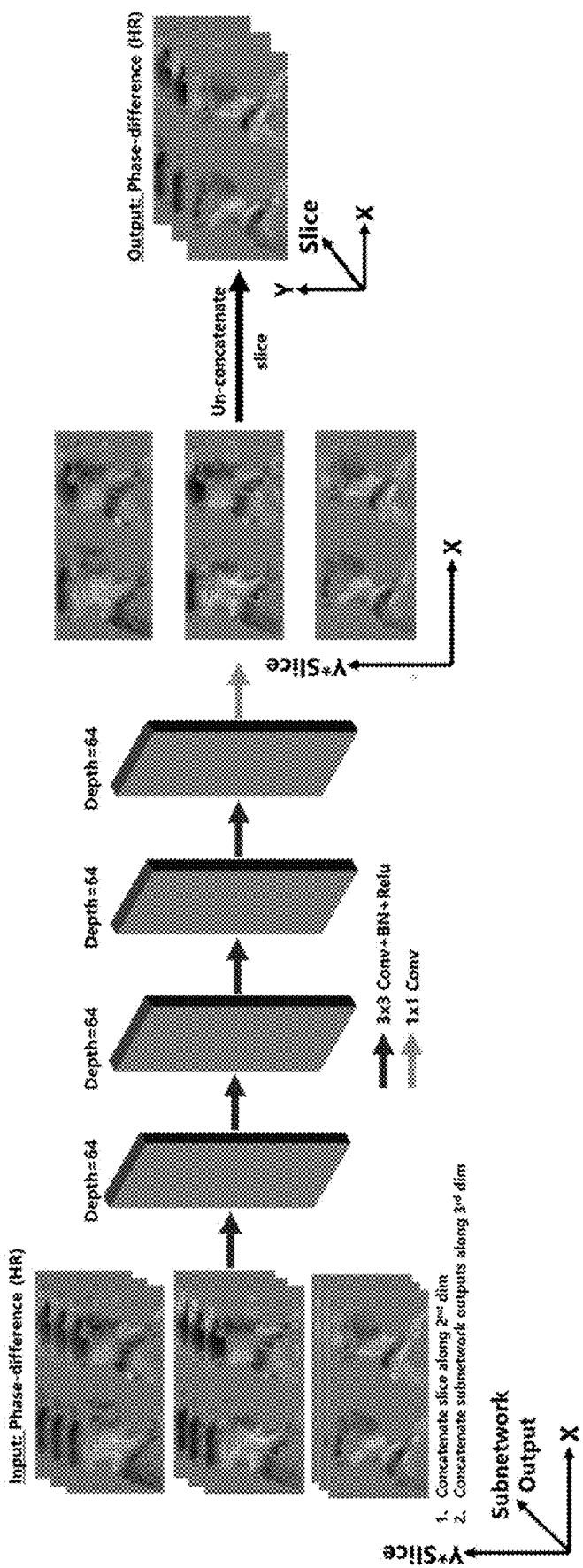
FIG. 7 is a graphic illustration of a weighted combination subnetwork according to an exemplary embodiment of the present disclosure.

FIG. 7 is a prophetic illustration of the weighted combination DL subnetwork. The first three subnetworks each yield a HR phase difference image. The weighted combination DL subnetwork is trained to determine the convolutional weights needed to best combine the output from each network. Common training cost functions for machine (deep) learning based reconstruction include mean squared error, mean absolute error, structural similarity index, perceptual loss cross-entropy, dice loss, and combinations of these methods. Other cost functions exist and generating new cost functions is an active area of research. While FIG.

7 depicts the process using HR images, the process is the same for other applications like artifact reduction and denoising.

In an embodiment the combination will occur by first concatenating the slice dimension along the second spatial dimension. Then, the outputs from each of the first three subnetworks are concatenated along the third dimension. Next, the concatenated outputs undergo complex-valued convolution using a linear architecture 705. Finally, each image with be collapsed from the third dimension to produce a single HR complex-valued-phase-difference image for each slice. The convolutional weights are then applied to produce a single HR phase-difference image. When needed, the single HR phase-difference image is then un-concatenated to separate the slice dimension from the second spatial dimension.

Figure 8:
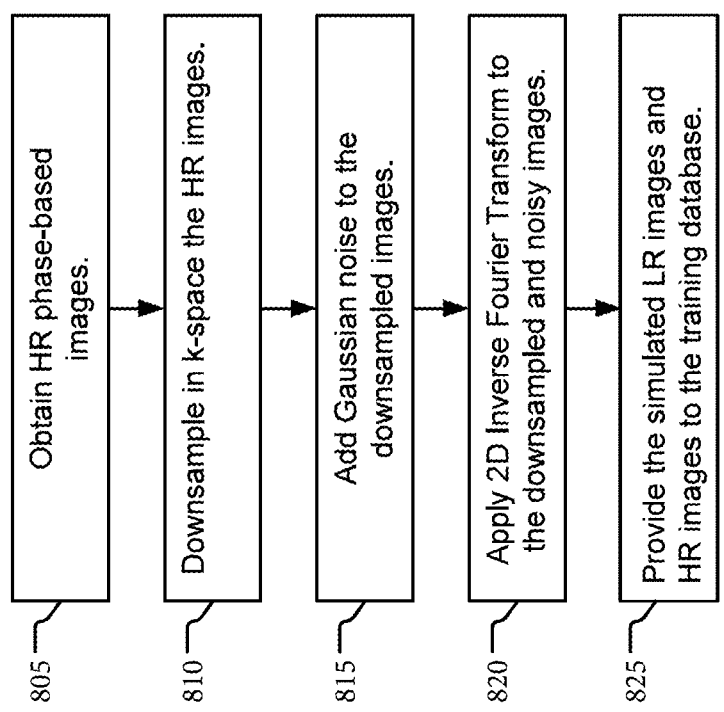
FIG. 8 is a flow diagram of a method for creating a training database for training a deep learning framework to process a low resolution complex-number-based image into a high resolution complex-number-based image according to an exemplary embodiment of the present disclosure.

FIG. 8 provides a flow diagram of a method 800 for creating a training database for training a deep learning framework to convert LR complex-number-based images to HR complex-number-based images. Step 805 consists of obtaining HR complex-number-based images. Step 810 downsamples in k-space the images obtained in step 805. Step 815 adds Gaussian noise to the images produced during step 810. Step 820 applies a 2D Inverse Fourier Transform to the downsampled and noisy images produced in step 815. Step 825 provides the LR input images and HR output images to the training database to train the network to achieve the desired HR output images from the simulated LR input images.

As there can be advantages to both approaches, each subnetwork can be trained separately or together in an end-to-end (or monolithic) fashion. In the end-to-end or monolithic implementation the different subnetworks are all connected and their parameters are trained simultaneously during machine learning training as described above.

Figure 9:
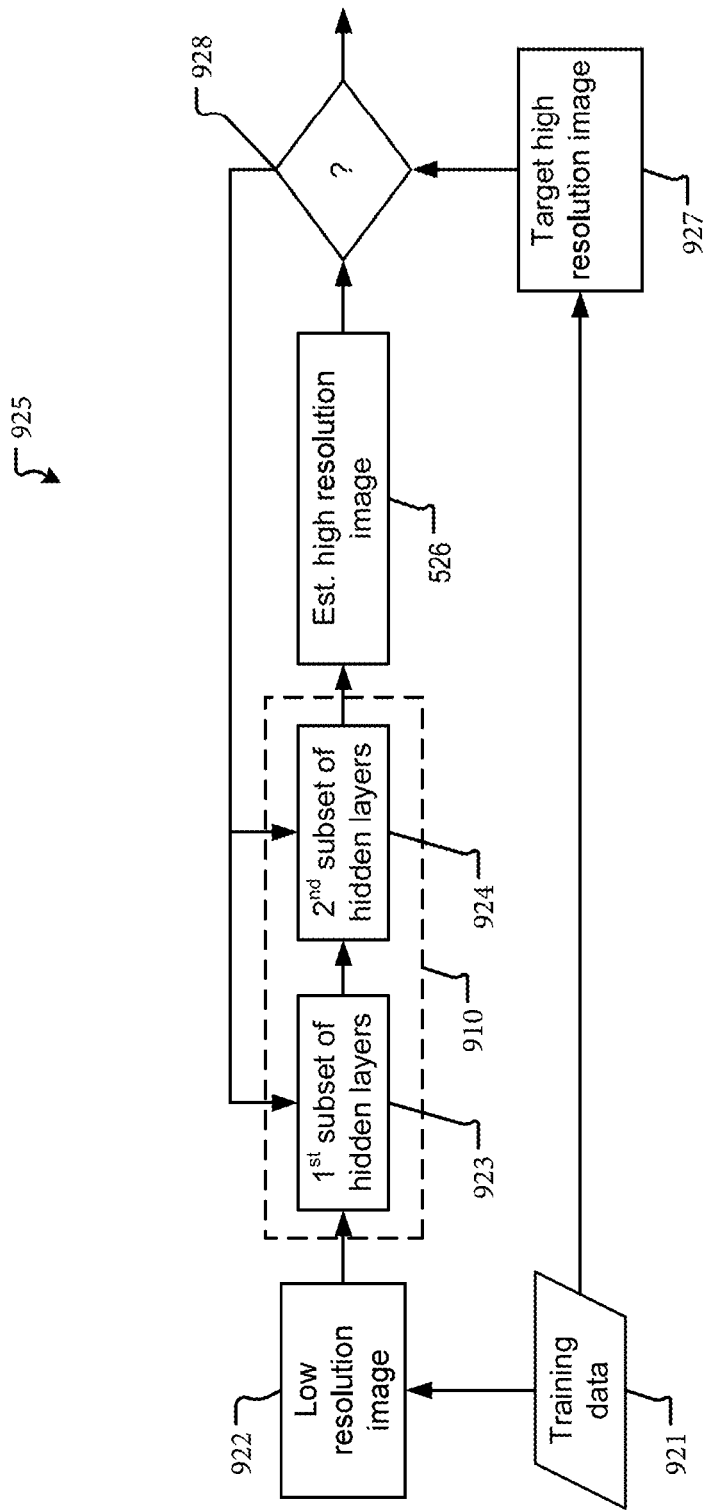
FIG. 9 is a flow diagram of a training phase of a method for improving quality of complex-number-based images according to an exemplary embodiment of the present disclosure.

FIG. 9 is a flow diagram of a training method for processing a LR complex-number-based image to a HR complex-number-based image, according to an exemplary embodiment of the present disclosure. The training phase may include optimization of a neural network, which can vary with the type of image for which the network is going to be used. In an exemplary embodiment, the method of the present disclosure employs a Residual U-net, as described above with reference to FIG. 2.

Generally, the Residual U-net receives training data, for instance LR training images, as inputs and outputs an estimated HR image. In one embodiment, the training images may be a simulated LR TE1 and a simulated LR TE2 and the output may be an approximation of the reference HR phase-difference image. Specifically, training a Residual U-net 910 begins with obtaining data from a training database 921. The training data can include a simulated set of LR images 922 and a corresponding set of HR images 927. The set of LR images can be provided as an input layer of the Residual U-net 910 at step 923. The input layer can be provided to a first subset of hidden layers of the Residual U-net 910 at step 923. In the event the architecture of the Residual U-net follows that of FIG. 2, the first subset of hidden layers of the Residual U-net 910 may be a contracting phase of the Residual U-net 910. I an embodiment, an output of the first subset of hidden layer is then the input for a second subset of hidden layers of the Residual U-net 910, at step 924, during an expansive phase. Subsequent n hidden layers of the Residual U-net 910, or subsequent n subsets of hidden layers of the Residual U-net 910, can be included as desired. As in the example of FIG. 9, the output of the second subset of hidden layers at step 924 of training phase 925 then becomes the input for an output layer at step 926, the output layer at step 926 being a fully connected layer and producing an estimated HR image based on training data. The Residual U-net 910 estimated HR image can then be compared with the corresponding target HR image 927 at step 928, and a loss of function therebetween can be minimized. If, at step 928, it is determined that an error criterion is met and the loss of function has been minimized, the Residual U-net 910 is determined to be sufficiently trained and ready for implementation with unknown, real-time data. Alternatively, if it is determined at step 928 that the error criterion is not met and the loss function has not been minimized, the training phase of 925 returns to step 923 and updates are made to the weights/coefficients of the Residual U-net 910.

Figure 10:
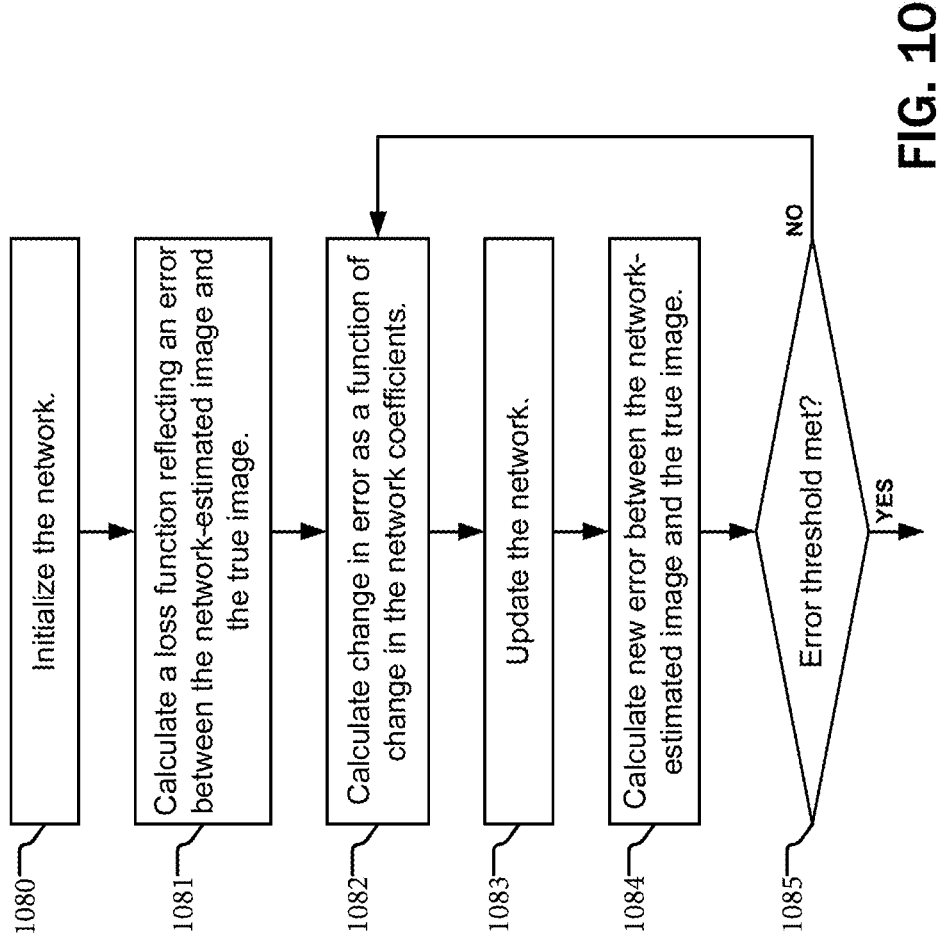
FIG. 10 is a flow diagram of neural network training of a training phase of a method for improving quality of complex-number-based images according to an exemplary embodiment of the present disclosure.

FIG. 10 shows a flow diagram of one implementation of the training phase performed during optimization of the Residual U-net 910. During the training phase, representative data from the training database are used as training data to train a Residual U-net, resulting in an optimized Residual U-net being output from the training phase. The term "data" here can refer to an image of the training image database. More generally, data can be referred to as defect-exhibiting data, for which the "defect" can be any undesirable characteristic that can be affected through image acquisition (e.g., motion) or image processing (e.g., noise or an artifact). In an example using training images for data, the training phase of FIG. 9 can be an offline training method that trains the Residual U-net using a large number of LR images that are paired with corresponding HR images to train the Residual U-net to estimate a HR image from the LR images.

During the training phase, a training database is accessed to obtain a plurality of datasets and the network is iteratively updated to reduce the error (e.g., the value produced by a loss function), wherein updating the network includes iteratively updating values of, for example, network coefficients, at each layer of the Residual U-net, such that the LR images processed by the Residual U-net, increasingly, closely matches the target HR image. In other words, the Residual U-net infers the mapping implied by the training data and the loss function produces an error value related to the mismatch between the target HR image and the HR image estimated by the current iteration of the Residual U-net.

FIG. 10 is a non-limiting example of an implementation of the training phase 925 for training the Residual U-net using the training data. The data in the training data can be from any of the training sets in the training database that include a plurality of images.

At step 1080 of the training phase of FIG. 10, an initial guess is generated for the coefficients of the Residual U-net. Step 1081 to step 1085 provide a non-limiting example of an optimization method for training the residual U-net. In step 1081 of training phase, an error is calculated (e.g. using a loss function) to represent a measure of the difference between the target HR image and the output data of the Residual U-net as applied to the current iteration of the Residual U-net. Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the specific dataset, which is referred to as overfitting. In the case of overfitting, the Residual U-net becomes a poor generalization, and the variance will become large because the images vary between datasets. The minimum total error occurs when the sum of bias and variance are minimal. Accordingly, it is desirable to reach a local minimum that explains to data in the simplest possible way to maximize the likelihood that the trained network represents a general solution, rather than a solution particular to the training data. This goal can be achieved by, for example, early stopping, weight regularization, lasso regularization, ridge regularization, or elastic net regularization.

Step 1082 of the training phase determines a change in the error as a function of the change in the network can be calculated (e.g., an error gradient) and this change in the error can be used to select a direction and step size for a subsequent change in the weights/coefficients of the Residual U-net. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 1083 of the training phase, a new set of coefficients are determined for the Residual U-net. For example, the weights/coefficients can be updated using the change calculated in step 1082, as in a gradient descent optimization method or an over-relaxation acceleration method.

In step 1084 of the training phase, a new error value is calculated using the updated weights/coefficients of the Residual U-net.

In step 1085 of the training phase 925, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations are reached. When the stopping criteria is not satisfied, the training phase 925 will continue back to the start of the iterative loop by returning and repeating step 1082 using the new weights/coefficients (the iterative loop includes steps 1082, 1083, 1084, and 1085). When the stopping criteria are satisfied, the training phase 925 is completed.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), or a portable storage device, e.g., a universal serial bus (USB) flash drive, to name just a few. Computer readable media suitable for storing computer program instructions and data include all foul's of non-volatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be Supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or frontend components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An apparatus for performing image processing, including, but not limited to: processing circuitry configured to: apply, to inputs of a first trained neural network trained to process real-number-based images, first image data generated from real-number-based measurements obtained by imaging a subject; apply, to inputs of a second trained neural network trained to process complex-number-based images, second image data generated from complex-number-based measurements obtained by imaging the subject; and combine a first output of the first trained neural network and a second output of the second trained neural network to produce a combined image, based on the first image data and the second image data.

(2) The apparatus according to (1), wherein the first and second trained neural networks are deep learning-based neural networks.

(3) The apparatus according to any one of (1) and (2), wherein the processing circuitry is further configured to produce the combined image by calculating a weighted combination of the first and second outputs.

(4) The apparatus according to any one of (1) and (2), wherein the processing circuitry is further configured to produce the combined image by applying the first and second outputs to a third neural network trained to produce the combined image from the real-number-based measurements and from the complex-number-based measurements.

(5) The apparatus according to any one of (1) and (2), wherein the processing circuitry is further configured to apply, to inputs of a third trained neural network trained to process at least one of real-number-based images and complex-number-based images, third image data from measurements obtained by imaging the subject, and wherein the processing circuitry is further configured to produce the combined image by combining a third output of the third trained neural network with the first and second outputs.

(6) The apparatus according to any one of (1)-(5), further comprising the first trained neural network and the second trained neural network, wherein the first trained neural network comprises a magnitude-based neural network trained to process magnitude-based images, and the second trained neural network comprises a phase-based neural network trained to process phase-based images.

(7) The apparatus according to (6), wherein the phase-based neural network trained to process phase-based images includes, but not limited to, a phase-difference-based neural network trained to process phase-difference-based images.

(8) The apparatus according to any one of (1)-(7), wherein the first image data has a first resolution, the second image data has a second resolution, and the combined image has a third resolution, and wherein the third resolution is greater than at least one of the first and second resolutions.

(9) The apparatus according to any one of (1)-(8), wherein the processing circuitry is further configured to generate a mask image from the first image data, and wherein the second image data is generated by applying the mask image to third image data generated from the complex-number-based measurements obtained by imaging the subject.

(10) The apparatus according to any one of (1)-(7), wherein the combined image generated by the processing circuitry has fewer artifacts than at least one of the first image data and the second image data.

(11) The apparatus according to any one of (1)-(7), wherein the combined image generated by the processing circuitry has less noise than at least one of the first image data and the second image data.

(12) The apparatus according to any one of (1)-(7), wherein the first image data and the second image data are dual-echo sequence data acquired by a magnetic resonance imaging device.

(13) The apparatus according to any one of (1)-(7), wherein the first image data and the second image data are data acquired by an ultrasound probe.

(14) An image processing method, including, but not limited to: applying, to inputs of a first trained neural network trained to process real-number-based images, first image data generated from real-number-based measurements obtained by imaging a subject; applying, to inputs of a second trained neural network trained to process complex-number-based images, second image data generated from complex-number-based measurements obtained by imaging the subject; and combining a first output of the first trained neural network and a second output of the second trained neural network to produce a combined image, based on the first image data and the second image data.

(15) An image processing method performing the functions of any one of (2)-(13).

(16) A non-transitory computer-readable storage medium storing computer-readable instructions that, when executed by a computer, cause the computer to perform an image processing method, including, but not limited to: applying, to inputs of a first trained neural network trained to process real-number-based images, first image data generated from real-number-based measurements obtained by imaging a subject; applying, to inputs of a second trained neural network trained to process complex-number-based images, second image data generated from complex-number-based measurements obtained by imaging the subject; and combining a first output of the first trained neural network and a second output of the second trained neural network to produce a combined image, based on the first image data and the second image data.

(17) The non-transitory computer-readable storage medium storing computer-readable instructions that, when executed by a computer, cause the computer to perform an image processing method of any one of (2)-(13).

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for performing image processing, comprising:
processing circuitry configured to
apply, to inputs of a first trained neural network trained to process real-number-based images, first image data generated from real-number-based measurements obtained by imaging a subject;
apply, to inputs of a second trained neural network trained to process complex-number-based images, second image data generated from complex-number-based measurements obtained by imaging the subject;
apply, to inputs of a third trained neural network trained to process complex-number-based images, third image data generated from complex-number-based measurements obtained by imaging the subject; and
combine a first output of the first trained neural network, a second output of the second trained neural network, and a third output of the third trained neural network to produce a combined image, based on the first image data, the second image data, and the third image data.

2. The apparatus according to claim 1, wherein the first, second, and third trained neural networks are deep learning-based neural networks.

3. The apparatus according to claim 1, wherein the processing circuitry is further configured to produce the combined image by calculating a weighted combination of the first, second, and third outputs.

4. The apparatus according to claim 1, wherein the processing circuitry is further configured to produce the combined image by applying the first and second outputs to a fourth neural network trained to produce the combined image from the real-number-based measurements and from the complex-number-based measurements.

5. The apparatus according to claim 1, wherein the processing circuitry is further configured to apply, to inputs of a fourth trained neural network trained to process at least one of real-number-based images and complex-number-based images, fourth image data from measurements obtained by imaging the subject, and
wherein the processing circuitry is further configured to produce the combined image by combining a fourth output of the fourth trained neural network with the first, second, and third outputs.

6. The apparatus according to claim 1, further comprising the first trained neural network and the second trained neural network, wherein the first trained neural network comprises a magnitude-based neural network trained to process magnitude-based images, and the second trained neural network comprises a phase-based neural network trained to process phase-based images.

7. The apparatus according to claim 6, wherein the phase-based neural network trained to process phase-based images comprises a phase-difference-based neural network trained to process phase-difference-based images.

8. The apparatus according to claim 1, wherein the first image data has a first resolution, the second image data has a second resolution, and the combined image has a third resolution, and
wherein the third resolution is greater than at least one of the first and second resolutions.

9. The apparatus according to claim 1, wherein the processing circuitry is further configured to generate a mask image from the first image data, and
wherein the second image data is generated by applying the mask image to third image data generated from the complex-number-based measurements obtained by imaging the subject.

10. The apparatus according to claim 1, wherein the combined image generated by the processing circuitry has fewer artifacts than at least one of the first image data and the second image data.

11. The apparatus according to claim 1, wherein the combined image generated by the processing circuitry has less noise than at least one of the first image data and the second image data.

12. The apparatus according to claim 1, wherein the first image data and the second image data are dual-echo sequence data acquired by a magnetic resonance imaging device.

13. The apparatus according to claim 1, wherein the first image data and the second image data are data acquired by an ultrasound probe.

14. An image processing method, comprising:
applying, to inputs of a first trained neural network trained to process real-number-based images, first image data generated from real-number-based measurements obtained by imaging a subject;
applying, to inputs of a second trained neural network trained to process complex-number-based images, second image data generated from complex-number-based measurements obtained by imaging the subject;
applying to inputs of a third trained neural network trained to process complex-number-based images, third image data generated from complex-number-based measurements obtained by imaging the subject; and
combining a first output of the first trained neural network, a second output of the second trained neural network, and a third output of the third trained neural network to produce a combined image, based on the first image data, the second image data, and the third image data.

15. A non-transitory computer-readable storage medium storing computer-readable instructions that, when executed by a computer, cause the computer to perform an image processing method, comprising:
- applying, to inputs of a first trained neural network trained to process real-number-based images, first image data generated from real-number-based measurements obtained by imaging a subject;
- applying, to inputs of a second trained neural network, trained to process complex-number-based images, second image data generated from complex-number-based measurements obtained by imaging the subject;
- applying, to inputs of a third trained neural network trained to process complex-number-based images, third image data generated from complex-number-based measurements obtained by imaging the subject; and
- combining a first output of the first trained neural network, a second output of the second trained neural network, and a third output of the third trained neural network to produce a combined image, based on the first image data, the second image data, and the third image data.

* * * * *